Dec. 31, 1963
F. D. JOESTING
3,116,016
AIR CONDITIONING APPARATUS HAVING VOLUME
AND TEMPERATURE CONTROL
Filed Dec. 7, 1961
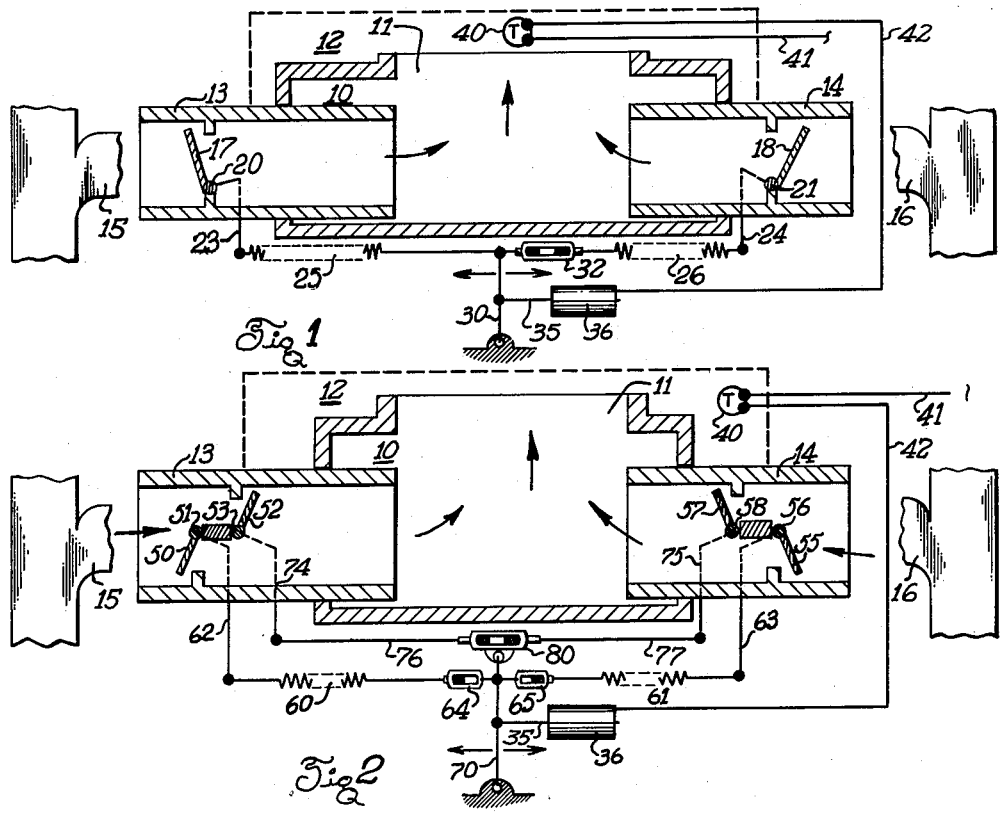
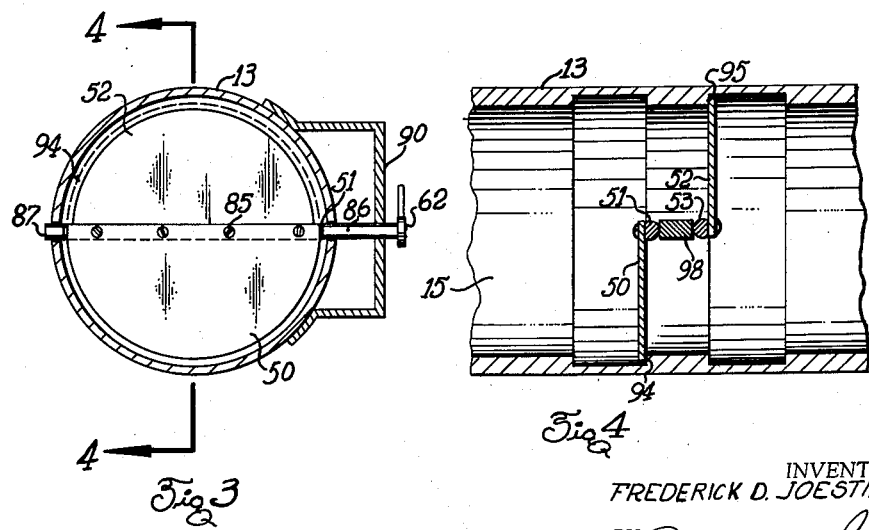
INVENTOR.
FREDERICK D. JOESTING
BY *Joseph E. Ryan*
ATTORNEY

United States Patent Office 3,116,016
Patented Dec. 31, 1963

3,116,016
AIR CONDITIONING APPARATUS HAVING VOLUME AND TEMPERATURE CONTROL
Frederick D. Joesting, Park Ridge, Ill., assignor to Minneapolis-Honeywell Regulator Company, Minneapolis, Minn., a corporation of Delaware
Filed Dec. 7, 1961, Ser. No. 157,673
5 Claims. (Cl. 236—13)

This invention relates to an air conditioning control apparatus of the double duct type and more particularly to an improved apparatus of this type which has a simplified combined volume and temperature control.

Air conditioning control apparatus for double duct air conditioning systems or for mixing boxes which distribute conditioned air from such systems are well known. The present invention is directed to a simplified valving arrangement and composite control for the same which provides accurate volume control or constant output for circulation purposes which control system is adjustable for varying output ranges and with the valving operable to proportion the amount of hot and cold air from the double duct to provide control of temperature to the space being conditioned thereby. It is therefore an object of this invention to provide an improved air conditioning control apparatus with a simplified valving structure. A further object of this invention is to provide a control arrangement for a double duct air conditioning system in which the control of temperature remains in the valve while providing constant volume control. It is still further an object of this invention to provide a control apparatus of this type where a single motor or separate motors can be utilized for resetting volume regulators or valves in the control in accordance with temperature in a simplified arrangement. These and other objects of this invention will become apparent from a reading of the attached description together with the drawings wherein:

FIGURE 1 is a schematic diagram of one embodiment of the invention,

FIGURE 2 is a schematic diagram of a second embodiment of the invention, and

FIGURES 3 and 4 are sectional views of a portion of a valve used in the embodiment of FIGURE 2 in diagrammatic form.

My improved air conditioning apparatus is shown in a simplified schematic form in FIGURE 1 as including generally a mixing box having an outlet 11 communicating with a space 12 to be air conditioned. The mixing box has positioned therein a pair of inlet conduits 13, 14 which connect to supply conduits 15, 16 respectively containing hot and cold tempered air from a double duct supply system. The mixing box acts as a proportioning distribution unit mixing the tempered air to the desired temperature and discharging it to the space to be air conditioned through the outlet 11 in accordance with the temperature requirements of the space. Inlet conduits 13, 14 include pivoted damper blades 17, 18 respectively which blades are shown schematically as being mounted on a shaft 20, 21 respectively, the shafts being journalled in the inlet conduits to provide pivotal movement of the blade with respect to the inlet conduit. The blades and conduits respectively form valve means which control the flow of tempered air from the supply conduits 15, 16 to the interior of the mixing chamber 10 as will be hereinafter noted. The damper blades 17, 18 through their respective shafts 20, 21 are moved by means of a linkage or lever member indicated at 23, 24 respectively to cause pivotal movement of the damper blade on its respective shaft with respect to the inlet conduits associated therewith. The ends of the respective levers 23, 24 have attached thereto bias springs 25, 26 which springs are connected at the opposite extremity to another pivoted lever indicated at 30. Positioned between the spring 26 and the pivoted lever is an adjustable connector 32 which connector is adapted to vary the length of the linkage between the springs and the pivoted lever and hence the initial bias on the springs for balance purposes. Lever 30 has connected thereto an output shaft 35 of a pneumatic motor or motive means 36 which motor is connected to and controlled by a thermostat indicated schematically at 40. Thermostat 40 is supplied from a pneumatic supply pipe 41 and establishes a branch line pressure in accordance with temperature demands of the space to control pressure in the conduit 42 leading to the motor and hence control proportionally the operation of the motor to pivot the lever 30 and move the ends of the respective springs 25, 26 to cause movement of the damper linkages 23, 24 and hence the blades 17, 18. The respective blades and spring combinations 17, 25 and 18, 26 provide volume regulators establishing a constant but adjustable flow through the respective inlet conduits 13, 14 with variation in pressure of the air conditioning medium supplied from the supply conduits 15, 16. As will be noted in FIGURE 1, the blades 17, 18 in their normal position are adjusted partially and equally open to provide a predetermined minimum flow through the supply conduits to the interior of the mixing chamber. Variation in pressure at either supply conduit will adjust the blade to maintain a constant discharge to the interior of the mixing box 10. Motor means 36 as controlled by the thermostat 40 in effect moves the ends of the springs and hence adjusts the bias on the regulator to reset the regulators to a new position wherein the damper blades are moved differentially, that is one opens when the other closes to allow greater or lesser amounts of tempered air to increase the flow through one of the ducts and decrease the flow through the other of the inlet ducts 13, 14 respectively. Thus, the thermostat will energize the motor to differentially move the lever 30 and hence the levers 23, 24 in opposite directions such that the respective blades 17, 18 will be moved to increase the flow of warm air and decrease the flow of cold air to the mixing chamber 10 or oppositely to increase the flow of cold air and decrease the flow of warm air depending upon the temperature requirements in the space to be air conditioned. Thermostat 40 and hence motor 36 may be reverse or direct acting depending upon which valve it is desired to open or close. Thus, as is indicated in FIGURE 1, and in hereinafter to be described FIGURE 2, the valves or damper blades may open or close for a given direction of motor movement depending upon whether the thermostat is direct or reverse acting, whether the air conditioning function is to be heating or cooling, and which supply conduit or hot and cold duct the respective valve is connected to. Motor means 36 as controlled by the thermostat 40 operates basically to reset the regulating valves such that with the new settings the blades will move through the change in spring bias and pressure applied to the blades from the air conditioning medium. The respective valves will still respond to the pressure variation as sensed by the blades 17, 18 respectively to maintain a constant flow through the respective inlet ducts 13, 14 to the interior of the mixing chamber with pressure variation in the supply conduits 15, 16 which flow will be proportionally increased or decreased in accordance with temperature requirements of the space to provide a desired temperature of air conditioning medium or air being discharged at the outlet 11 to the space to be air conditioned. The individual flow regulators or volume regulator, as the respective damper blades 17 and 18 function, are initially set by the manual adjusting mechanism 32 which in effect shortens the connecting linkage between the extremities of the springs 25, 26 or increases the same so that the respective regulators may be preset for a given initial volume flow with a normal pressure in the conduits 15, 16. Where different total flow outputs are required from individual mixing boxes in different zones in a system, or where it is desired to initially set or reset desired total outflow at a particular mixing box, the adjusting mechanism or connector 32 is operated to vary the length of the linkage between the springs 25, 26 and the pivoted lever 30 to vary the bias on the springs and hence the position of the damper blades 17, 18 simultaneously for greater or lesser flow to the outlet 11 with given duct pressures. While a single adjusting mechanism 32 is shown in FIGURE 1 as applied to the end of spring 26 cooperating with damper blade 18, it will be recognized that two such adjusting mechanisms may be employed to individually adjust the respective flow regulators. With the present arrangement the system is balanced on the basis of increasing or decreasing the flow through the regulator formed by the spring 26 and blade 18 with respect to the fixed setting obtained with the spring 25 and blade 17. It will be recognized, however, that individual adjustment will be required in the event that it is desired to differentially and selectively adjust each flow regulator separately.

The embodiment shown in FIGURE 2 is an improvement over the apparatus disclosed in FIGURE 1 in that provision is made for modifying the valving at the inlet of the ducts to adjust the same for varying desired total flow rates from various size mixing boxes or distribution systems with closer outflow regulation than that which is available in the embodiment of FIGURE 1. Thus, as will be seen in FIGURE 2, the mixing chamber 10 includes the outlet 11 designed to be connected with or associated with the space 12 to be air conditioned. In this embodiment, the mixing chamber 10 is provided with inlets connected to damper blades. Thus, it will be seen in the inlet conduit 13, 14 connected respectively to the supply conduits 15, 16. The inlet conduits 13, 14 in this embodiment include a modified valving in the form of two separate damper blades. Thus, as well be seen in the inlet conduit 13, there is positioned a pair of damper blades indicated schematically at 50 and 52, each having its own separate shaft 51, 53 mounting the same, the shafts extending through the wall of the inlet conduit and being journalled therein as will be shown in further detail in connection with FIGURES 3 and 4. Similarly, the inlet conduit 14 includes pivoted damper blades 55, 57 mounted respectively on shafts 56, 58 which are journalled in the inlet conduit 14 and extend across the same. As will be seen in FIGURES 3 and 4 the inlet conduits are circular in form and the blades semicircular in form. The respective blades 50, 55 form with the respective inlet conduits 13, 14 valves which cooperate with springs 60, 61 to form flow regulators as in the first mentioned embodiment. Thus, as will be seen in FIGURE 2, the damper 50 is connected through a drive linkage or lever 62 to which is attached the extremity of spring 60, the free extremity of the spring being connected through a manual adjusting linkage 64 the opposite extremity of which is connected to a pivoted lever 70 to be moved by the motor 36. Similarly the blade 55 is connected through a linkage 63 which is connected to the extremity of the spring 61 with the opposite extremity of the spring 61 being connected through a manual adjusting linkage 65 to the pivoted lever 70. While shown schematically, the shafts extend through the wall of the conduit and terminate at the levers 62, 63 which are interconnected as will be hereinafter noted.

The pivoted damper blades 52, 57 are mounted adjacent to the blades 51, 55 and, as will be seen in FIGURES 3 and 4, cover the opposite half of the inlet conduit being pivoted in the opposite direction to effect an opening through the conduit. These blades cooperate with the conduit to establish a second valving designed to set the desired flow or total flow to the mixing chamber and hence the desired total c.f.m. or total outflow to the space to be air conditioned. These blades are connected respectively through levers 74, 75 (shown schematically) which in turn are connected to rods or connecting members 76, 77 to a single adjusting linkage 80, the linkage in turn being connected to the extremity of the pivoted lever 70 and operated by motor 36. The adjusting mechanism 80 when moved will operate to vary the length of the linkages 77, 76 and hence cause pivoting of the blades 52, 57 to open or close the passages through the respective conduits 13, 14 to increase or decrease the normal setting for the desired outflow from the box. These second valves are used to vary the sizing of the control apparatus to accommodate greater flow rates from the mixing chamber to the space to be air conditioned. They are also connected to the motor and operative thereby such that one will open and the second will close with operation of the motor to vary the amount of flow from the respective supply conduits 15, 16 in the same manner and in the same direction of opening and closing as the motor 36 resets the flow regulators formed by dampers 50, 55 and springs 60, 61 respectively.

In this embodiment of the invention, the thermostat 40 is supplied from a pressure supply course indicated by conduit 41 to establish a branch line pressure from the thermostat which is connected or supplied through the conduit 42 to the motor 36 for controlled energization of the same.

In FIGURES 3 and 4 is shown a section of one of the valve schematically disclosed in FIGURE 2. Thus, for example, the FIGURE 3 shows a sectional view of the inlet conduit 13 apart from the mixing chamber with the damper blades 52 and 50 positioned therein. The respective blades are attached to shafts 51, 53 through suitable means such as screws indicated at 85. As will be seen in FIGURE 3, the shaft 51 extends across the inlet conduit 13 and is journalled therein through suitable bearing means such as indicated at 87, 86 with the shaft extending outside of the conduit and through a mounting or support bracket 90 suitably connected to the inlet conduit 13. The shaft 51 extends through an aperture in the bracket 90 and terminates in a linkage shown at 62. Additional details of the valve are shown in FIGURE 4 in which the blade 50 is free to swing in a counterclockwise direction away from a recessed stop portion 94 in the conduit and in which the blade 50 positioned against the stop 94 or recess represents the closed valve position. Similarly the blade 52 cooperates with a recessed portion 95 positioned in the conduit 13 such that when the blade 52 rests against the recess 95 the valve formed thereby is closed and the blade 52 is free to move clockwise as seen in FIGURE 4. The shafts 51, 53 are separated or spaced by means of a longitudinal spacing member 98 which extends across the inlet conduit, this spacing member having recessed surfaces (not shown) which operate as bearings and retainers for the shafts within the conduit.

As will be seen in the schematic sketches of the control apparatus of FIGURES 1 and 2, the respective valves or damper blades which form the movable portion thereof are connected from their respective output levers or linkages to the operating motor through the springs which form part of the flow regulators. Although not shown, it will be recognized that the spring and adjusting mechanism both form part of the linkage to the output shaft of the motor and the respective valves in each of the inlet ducts will be interconnected to the input shaft or lever 70 operated by the motor. The details of these linkages are not shown diagrammatically herein since they may take many forms. However, the concept of utilizing the flow regulator with the bias member outside of the valving simplifies the over-all structure and permits ready adjustment and setting or resetting of the flow regulator through temperature. In connection with FIGURE 2, the valving for the ducts 13, 14 is adjusted to provide for varying flow rates with closer flow regulation through the mixing chamber and through its outlet to a space to be air conditioned by the adjustment of the length of the linkages between the valves connected to the motor. These damper blades, although not forming part of the flow regulator, are moved with motor operation to differentially adjust the flow to the mixing chamber from the hot and cold supply 15, 16 to proportion the amount of hot and cold air to be supplied to the mixing chamber to meet the demands of the space to be air conditioned. The blades 50, 55 being spring biased by the springs 60, 61 outside of the mixing chamber will respond to variation in inlet pressure and compensate for this pressure variation to provide a substantially constant flow to the mixing chamber for given thermostat settings or response positions of the motive means 36 and hence the shaft 70.

Thus, for example, in the embodiment of FIGURE 2, the damper blades 50, 55 of the flow regulator respond to changes in static pressure and adjust for the same. These blades carry approximately half of the flow to the mixing chamber. As an example, with a static pressure of four inches, the blades 50 and 55 would be closed and all of the flow through the ducts 13, 14 will be through the openings around the blades 52, 57. At a static pressure of one inch, the flow through the pressure regulating blades 50, 55 or around the same would be the same as through the openings around the blades 52, 57. A decrease in duct pressure below this point permits the respective regulating valves to open further providing greater flow therethrough. Such a relationship makes it possible to more accurately control total outflow with variation in static pressure for any motor position for differing outflow requirements of the mixing box. The connection between the regulator blades and the motor and the setting blades and the motor must be such that the motor will move all blades in a direction to accomplish the flow regulation. To adjust the mixing box control system of FIGURE 2 for different total outflows, it is necessary to adjust the connections or members 80, 64 and 65 in the proper relationship to each other which is normally done at installation or setup of the system.

In the embodiments above, the relationship between the force of the air pressure and the compensating effect of the spring or the spring loaded blades is normally not linear. Therefore the springs may be adjusted in a manner to offset the normal force vs. length relationship of a spring for more accurate regulation. While not shown specifically, it will be understood that the levers connected to the springs will move in an arcuate or curved path and this curved relationship in the adjustment of the springs attached to the levers may be designed to effect adjustment of the spring in a non-linear manner to exactly match the flow curves through or around the spring loaded damper blades.

In considering this invention, it should be remembered that the present disclosure is intended to be illustrative only and the scope of the invention should be determined only by the appended claims.

I claim as my invention:

1. In an air conditioning apparatus, a mixing chamber having an outlet passage adapted to be connected to a space to be air conditioned and a pair of inlet conduits, hot and cold supply conduits connected to said inlet conduits and adapted to contain hot and cold tempered air for supplying tempered air to said mixing chamber and to the space to be air conditioned, a pivoted damper blade positioned in each of said inlet conduits having an actuating arm, spring means connected to the actuating arm of each damper blade, said blades forming with said spring means a flow regulating valve means with respect to each of said inlet conduits to control the flow of hot and cold air therethrough a pivoted lever, connected to the ends of said spring means remote from said blades, said lever when moved on its pivot causing pivoting of said damper blades differentially through said spring means to differentially vary the flow of air through said inlet conduits, motor means connected to said last named pivoted lever to move said damper blades, thermostat means adapted to be responsive to the temperature of the space to be air conditioned connected to and controlling the operation of said motor means, and a manually adjustable linkage means connected between said pivoted lever and at least one of said spring means to vary the tension on said springs for adjusting the bias of the spring means acting on the damper blades in said inlet conduits to balance the flow through said inlet conduits for a predetermined setting of said thermostat means.

2. In an air conditioning apparatus, a mixing chamber having an outlet passage adapted to be connected to a space to be air conditioned and a pair of inlet conduits, hot and cold supply conduits connected to said inlet conduits and adapted to contain hot and cold tempered air for supplying tempered air to said mixing chamber and to the space to be air conditioned, a pivoted damper blade positioned in each of said inlet conduits and having an actuating arm outside of the conduit, spring means connected to the actuating arm of each damper blade, said blades forming with said spring means a flow regulating valve means with respect to each of said inlet conduits to control the flow of hot and cold air therethrough, a pivoted lever mounted outside said mixing chamber and connected to the ends of said spring means remote from said blades, said lever when moved on its pivot causing pivoting of said damper blades differentially through said spring means to differentially vary the flow of air through said inlet conduits, motor means connected to said last named pivoted lever to move said damper blades, thermostat means adapted to be responsive to the temperature of the space to be air conditioned connected to and controlling the operation of said motor means, and a manually adjustable linkage means connected between said pivoted lever and at least one of said spring means to vary the tension on said springs for adjusting the bias of the spring means acting on the damper blades in said inlet conduits to balance the flow through said inlet conduits for a predetermined setting of said thermostat means.

3. In an air conditioning apparatus, a mixing chamber having an outlet passage adapted to be connected to a space to be air conditioned and a pair of inlet conduits, hot and cold supply conduits connected to said inlet conduits and adapted to contain hot and cold tempered air for supplying tempered air to said mixing chamber and to the space to be air conditioned, a pivoted damper blade positioned in each of said inlet conduits and having an actuating arm, said blades forming a valve means with respect to each of said inlet conduits to control the flow of hot and cold air therethrough, spring means connected to the actuating arm of each damper blade, a pivoted lever connected to the ends of said spring means remote from the blades, said lever when moved on its pivot causing pivoting of said damper blades differentially through said spring means to vary the flow of air through said inlet conduits, motor means connected to said last named pivoted lever to move said damper blades, thermostat means adapted to be responsive to the temperature of the space to be air conditioned connected to and controlling the operation of said motor means, second pivoted damper blades positioned in each of said inlet conduits adjacent said first named pivoted damper blades, and means including linkage means connecting said second pivoted damper blades to said pivoted lever and said motor such that second blades in each of said inlet conduits move in a closing and opening direction respectively to correspond with closing and opening movement of said first named blades in said respective inlet conduits.

4. In an air conditioning apparatus, a mixing chamber having an outlet passage adapted to be connected to a space to be air conditioned and a pair of inlet conduits, hot and cold supply conduits connected to said inlet conduits and adapted to contain hot and cold tempered air for supplying tempered air to said mixing chamber and to the space to be air conditioned, a pivoted damper blade positioned in each of said inlet conduits and having an actuating arm extending outside of said conduit, said blades forming a valve means with respect to each of said inlet conduits to control the flow of hot and cold air therethrough, spring means connected to the actuating arm of each damper blade, a pivoted lever mounted outside said mixing chamber and connected to the ends of said spring means remote from the blades, said lever when moved on its pivot causing pivoting of said damper blades differentially through said spring means to vary the flow of air through said inlet conduits, motor means connected to said last named pivoted lever to move said damper blades, thermostat means adapted to be responsive to the temperature of the space to be air conditioned connected to and controlling the operation of said motor means, second pivoted damper blades positioned in each of said inlet conduits adjacent said first named pivoted damper blades, and means including linkage means connecting said second pivoted damper blades to said pivoted lever and said motor such that second blades in each of said inlet conduits move in a closing and opening direction respectively to correspond with closing and opening movement of said first named blades in said respective inlet conduits.

5. In an air conditioning apparatus, a mixing chamber having an outlet passage adapted to be connected to a space to be air conditioned and a pair of inlet conduits, hot and cold supply conduits connected to said inlet conduits and adapted to contain hot and cold tempered air for supplying tempered air to said mixing chamber and to the space to be air conditioned, a pivoted damper blade positioned in each of said inlet conduits and having an actuating arm, said blades forming a valve means with respect to each of said inlet conduits to control the flow of hot and cold air therethrough, spring means connected to the actuating arm of each damper blade, a pivoted lever connected to the ends of said spring means remote from the blades, said lever when moved on its pivot causing pivoting of said damper blades differentially through said spring means to vary the flow of air through said inlet conduits, motor means connected to said last named pivoted lever to move said damper blades, thermostat means adapted to be responsive to the temperature of the space to be air conditioned connected to and controlling the operation of said motor means, second pivoted damper blades positioned in each of said inlet conduits adjacent said first named pivoted damper blades, and means including first and second adjustable linkage means connecting said spring means and said pivoted lever and said second blades and said pivoted lever, said linkage means causing said blades in each of said inlet conduits to move in a closing and opening direction respectively to correspond with closing and opening movement of said first named pivoted damper blades in said respective inlet conduits.

References Cited in the file of this patent

UNITED STATES PATENTS

| | | |
|---|---|---|
| 947,166 | Smith | Jan. 18, 1910 |
| 1,743,731 | Scott | Jan. 14, 1930 |
| 1,852,918 | Chandler et al. | Apr. 5, 1932 |
| 2,255,324 | McGill | Sept. 9, 1941 |
| 2,438,734 | Zimmerman | Mar. 30, 1948 |
| 2,584,420 | Branson | Feb. 5, 1952 |
| 2,772,833 | Chace | Dec. 4, 1956 |
| 2,821,343 | Payne | Jan. 28, 1958 |
| 2,991,937 | Bottorf et al. | July 11, 1961 |

FOREIGN PATENTS

| | | |
|---|---|---|
| 253,317 | Great Britain | June 17, 1926 |